UNITED STATES PATENT OFFICE.

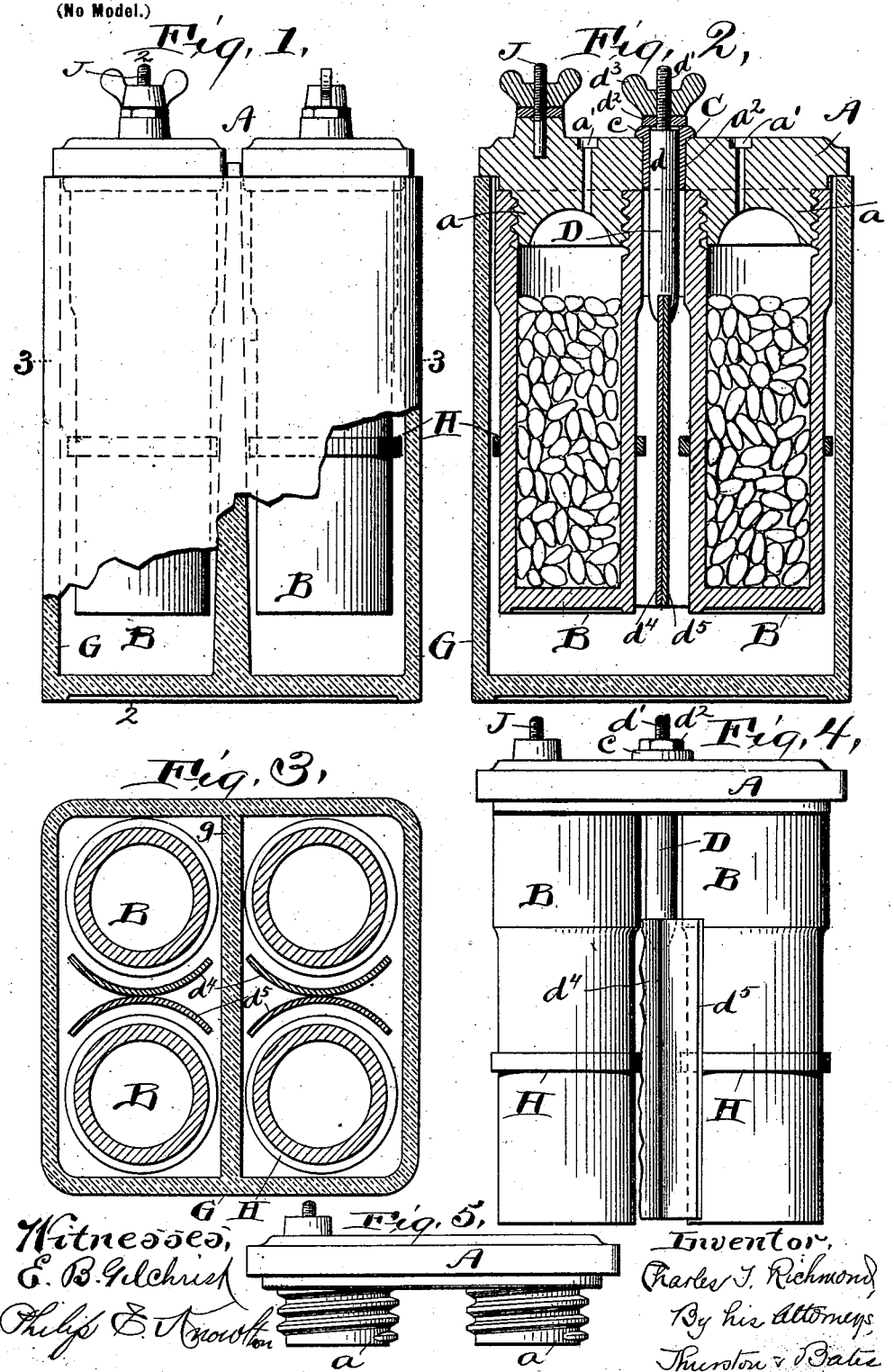

CHARLES T. RICHMOND, OF CLEVELAND, OHIO, ASSIGNOR TO THE NATIONAL CARBON COMPANY, OF SAME PLACE.

GALVANIC BATTERY.

SPECIFICATION forming part of Letters Patent No. 617,908, dated January 17, 1899.

Application filed July 18, 1898. Serial No. 686,206. (No model.)

*To all whom it may concern:*

Be it known that I, CHARLES T. RICHMOND, a citizen of the United States, residing at Cleveland, in the county of Cuyahoga and State of Ohio, have invented a certain new and useful Improvement in Galvanic Batteries, of which the following is a full, clear, and exact description, reference being had to the accompanying drawings.

The object of my invention is to make a powerful and durable galvanic battery which will occupy comparatively little space.

The invention consists in the construction and combination of parts constituting a single cell, and also in the combination of the elements of two or more cells with a single containing vessel subdivided into compartments by a partition or partitions, which serve also to prevent contact between the heads of the carbon elements of the individual cells.

In the drawings, Figure 1 is a side elevation, partly in section, of a duplex galvanic battery containing the invention—that is to say, a battery of two cells in a single containing vessel. Fig. 2 is a vertical sectional view on line 2 2 of Fig. 1. Fig. 3 is a horizontal sectional view on the line 3 3 of Fig. 1. Fig. 4 is a detached view of the combination of battery elements employed in a single cell. Fig. 5 is a detached view of one of the carbon cover-plates which constitute the head of a carbon element.

Referring to the parts by letters, A represents the head of a carbon electrode. It is a carbon plate and of such shape that it is adapted to rest upon the top of the jar and to serve as a cover therefor, as well as a support for the electrode in the jar. On its under side are two threaded bosses $a\ a$, onto which are screwed the porous carbon cups B. These cups contain a suitable depolarizing material—as, for example, manganese dioxid. In the head A are two vent-holes $a'$ for the escape of gas generated in the cups B.

Between the bosses $a\ a$ there is a hole $a^2$, passing through the plate A. In it is placed an insulating-sleeve C, having an external flange $c$, by which it is supported. The stem $d$ of the zinc element D passes through this sleeve and is provided with any suitable means for supporting the electrode and attaching the circuit-wires thereto—as, for example, the threaded stud $d'$, the washer $d^2$, and the thumb-nut $d^3$. Secured to the lower end of this stem are the two curved zinc plates $d^4\ d^5$, which lie between the two carbon cups, the concave side of said plates facing and partly embracing the cups. Rubber rings H may surround the carbon cups to prevent contact with the zinc plates. The zinc electrode constructed in the form shown and described presents a large surface for the action of the battery solution, and it likewise permits a compact assembling of the parts which of necessity must be in the jar submerged in the battery solution. A binding-post J for the carbon element, of any usual form, is embedded in the head A and extends upwardly therefrom.

The combination of battery elements, as described, may be placed in any suitable containing vessel or jar, on the top edges of which the head A may rest. A jar which approximately is of the form of a rectangle in horizontal section will contain the elements with comparatively little waste room, and for this principal reason is the preferred form for the containing vessel.

The containing vessel G shown in the drawings is designed to contain two sets of the described elements in the smallest space. It is substantially square in plan, and it is subdivided by an internal central vertical partition $g$, the top of which extends above the top of the sides. The cover-plates or heads A of the carbon electrodes rest upon the tops of the sides, and each plate is of such size as to serve as a cover for the compartment over which it is placed. The upward extension of the partition $g$ lies between the two cover-plates and prevents contact between them. There are therefore two complete cells in one containing vessel.

Although, as shown, only two compartments are formed in the containing vessel by the integral partition, any number of such compartments might be similarly formed without departing from the invention as set forth in the claims.

Having described my invention, I claim—

1. In a galvanic battery, the combination of a containing vessel with a carbon plate adapted to serve as a cover for said vessel and having two threaded bosses on its under side, and a hole between said bosses, two carbon electrodes which are screwed onto said bosses, and a zinc electrode which lies between said carbon electrodes, and a stem which passes out through the hole in the cover-plate between said bosses, substantially as described.

2. In a galvanic battery, the combined cover for the containing vessel and head and support for the carbon element, consisting of a carbon plate having on its under side two threaded bosses, and having a binding-post embedded in it projecting upward from its top surface, and having a hole $a^2$ through it between said bosses, combined with two carbon porous cups which are screwed upon said threaded bosses, and a zinc element whose stem passes through said hole, substantially as specified.

3. In a galvanic battery, the combination of a containing-jar, a carbon plate adapted to serve as a cover therefor and having two threaded bosses on its under side and a hole between said bosses, with two carbon porous cups which screw onto said bosses, the zinc element consisting of two curved plates which lie between said cups with their concave sides facing said cups, and a stem to which said plates are secured which passes out through said hole in the carbon plate and is insulated therefrom, substantially as specified.

In testimony whereof I hereunto affix my signature in the presence of two witnesses.

CHARLES T. RICHMOND.

Witnesses:
E. L. THURSTON,
CHAS. W. CHESNUTT.